March 7, 1967  A. E. ROSENBLAD  3,307,614
FALLING FILM TYPE EVAPORATORS AND METHOD
Filed Oct. 18, 1965  4 Sheets-Sheet 1
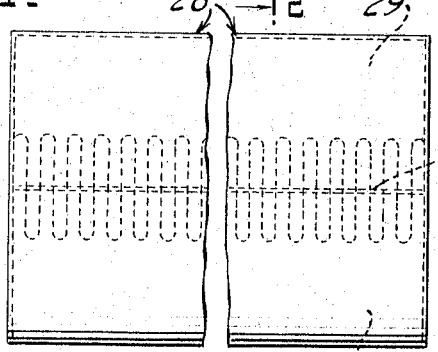
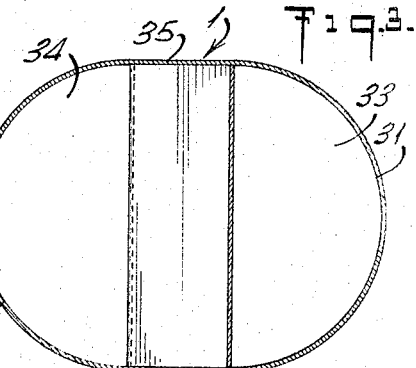
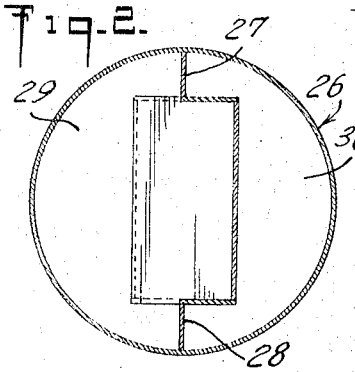
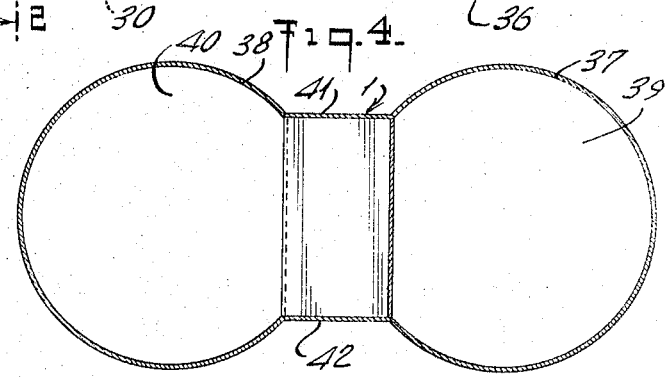
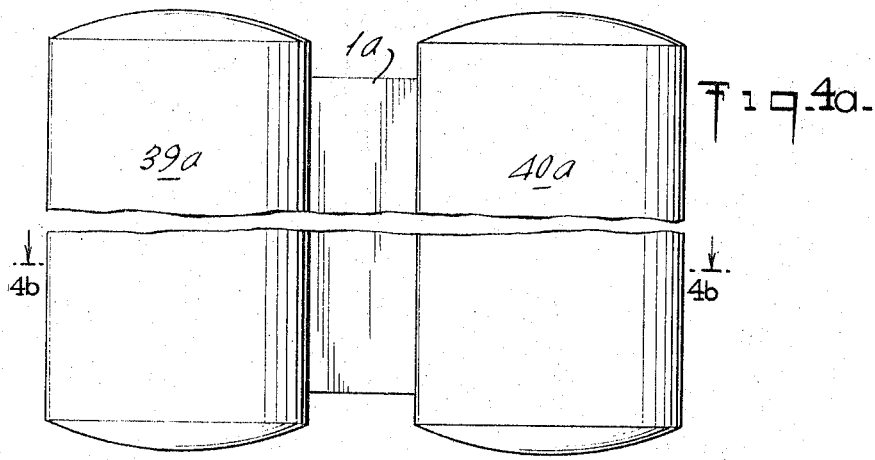
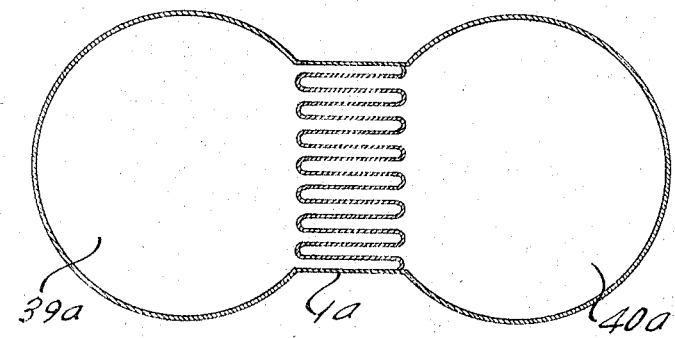
INVENTOR.
AXEL E. ROSENBLAD
BY
ATTORNEY March 7, 1967  A. E. ROSENBLAD  3,307,614
FALLING FILM TYPE EVAPORATORS AND METHOD
Filed Oct. 18, 1965  4 Sheets-Sheet 2
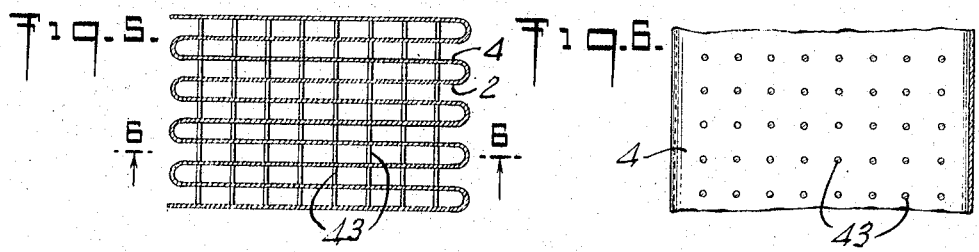
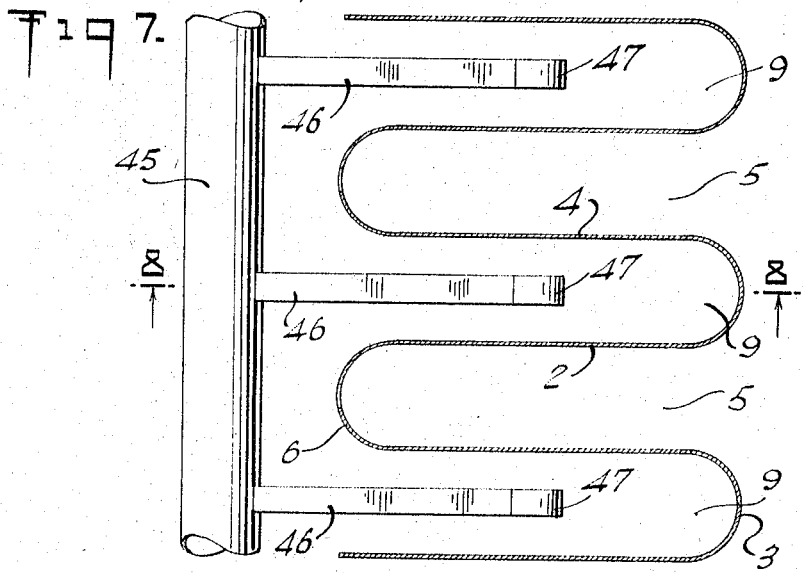
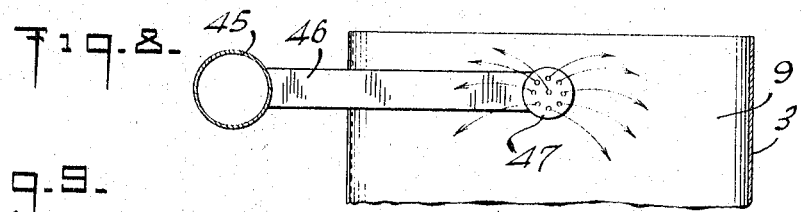
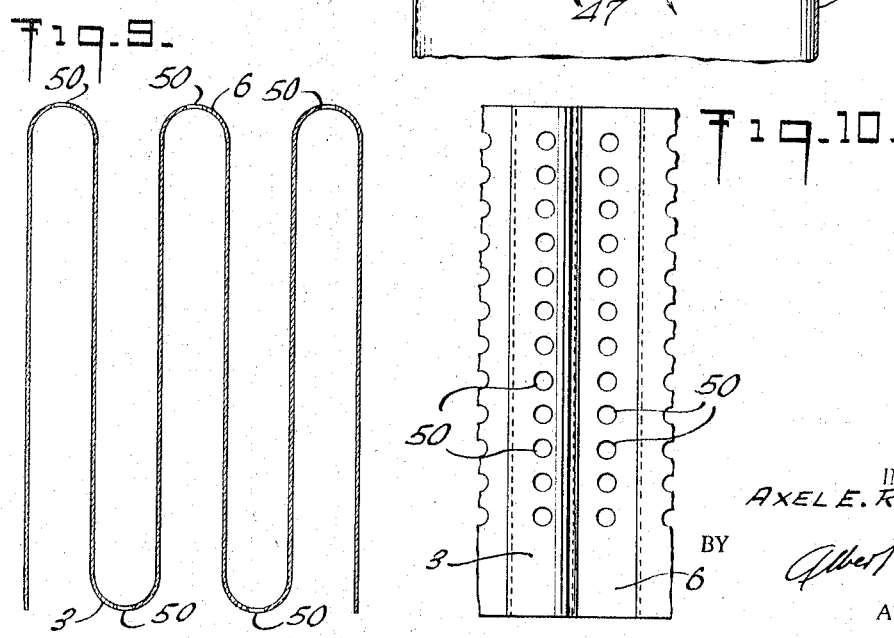
INVENTOR.
AXEL E. ROSENBLAD
BY
ATTORNEY

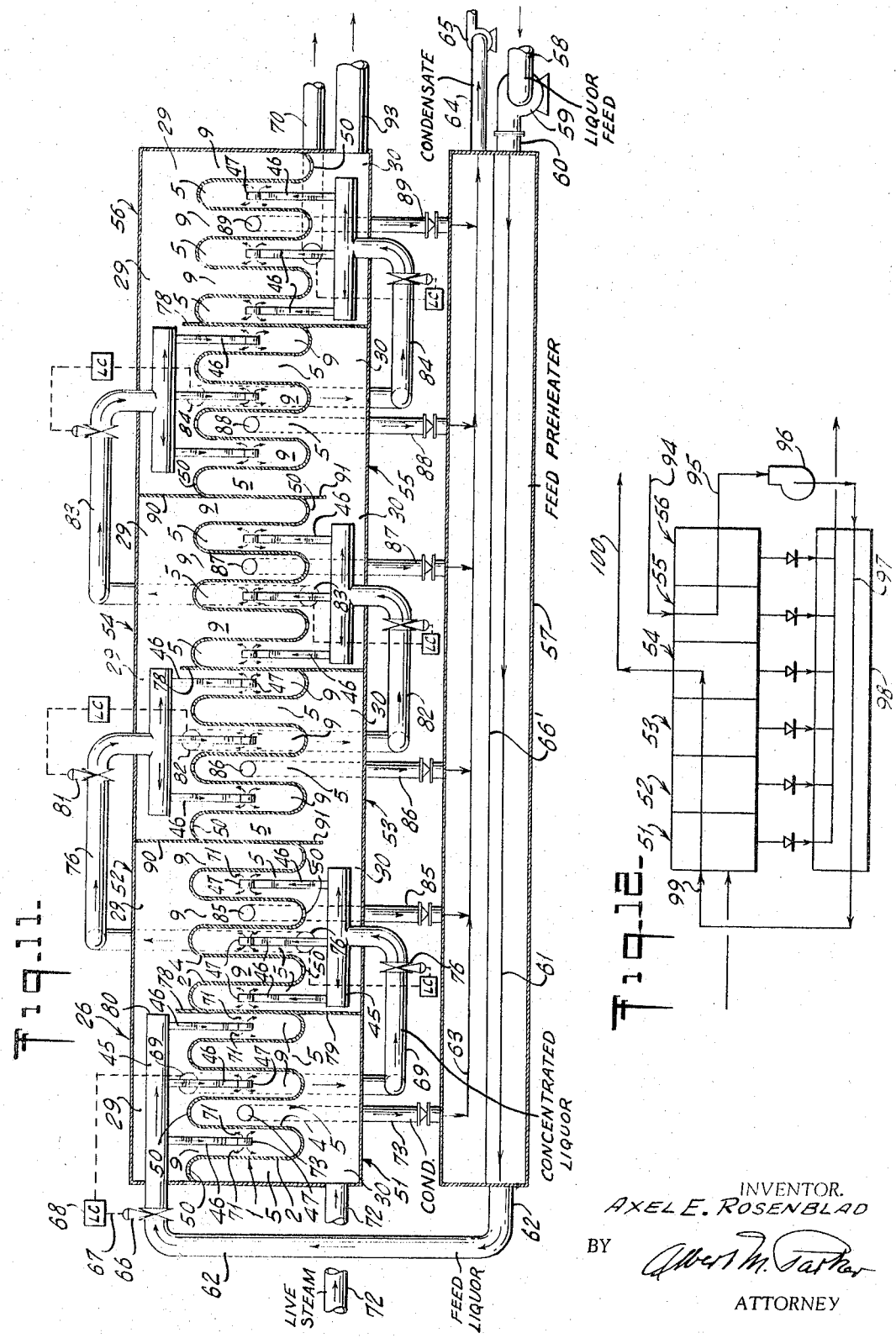

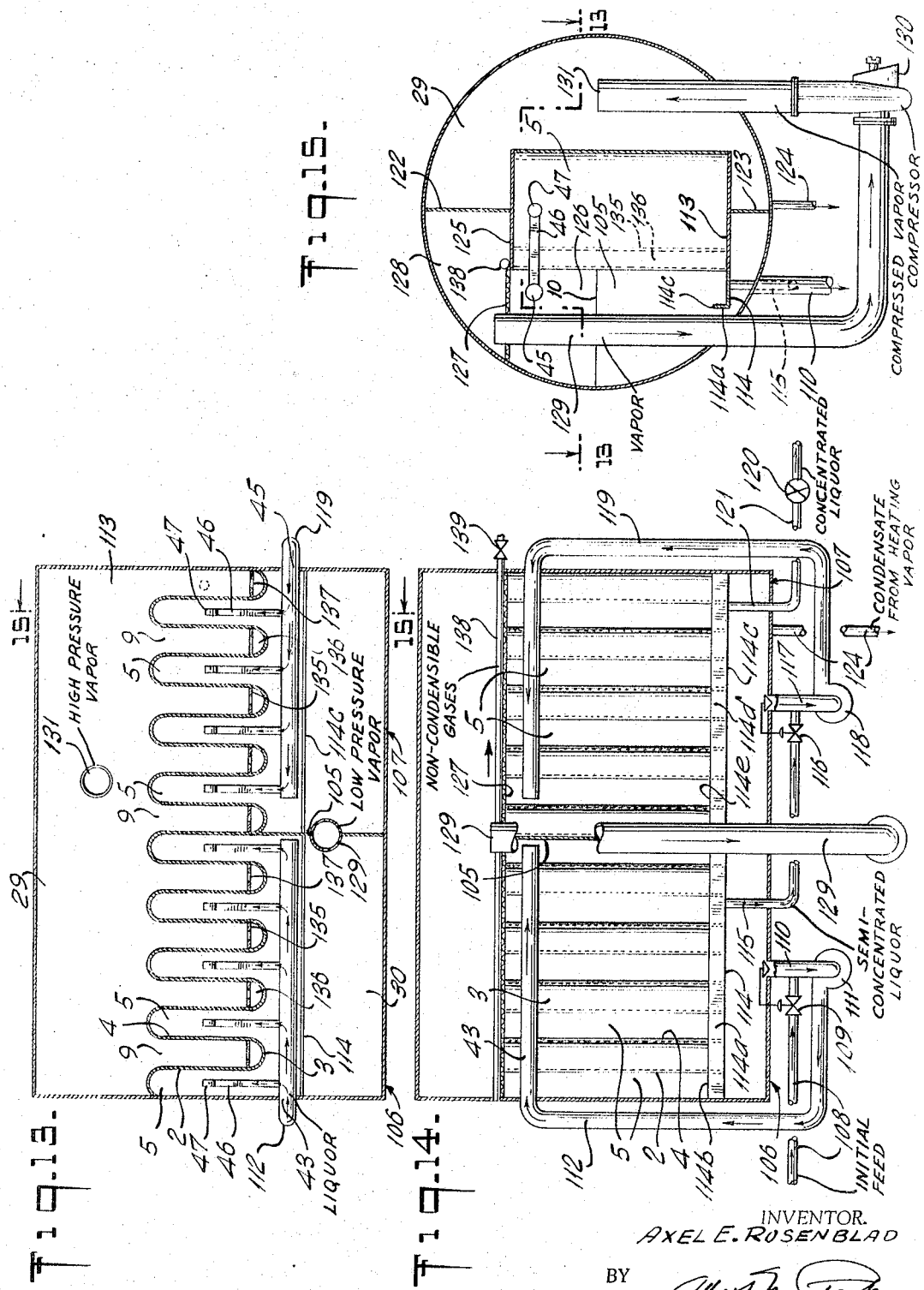

United States Patent Office 3,307,614
Patented Mar. 7, 1967

3,307,614
FALLING FILM TYPE EVAPORATORS AND METHOD
Axel E. Rosenblad, % Rosenblad Corp., P.O. Box 585, Princeton, N.J. 08540
Filed Oct. 18, 1965, Ser. No. 496,833
5 Claims. (Cl. 159—13)

This is a continuation-in-part of application Ser. No. 310,527, filed September 23, 1963, now abandoned.

This invention relates to falling film type evaporators, and is particularly concerned with improvements in wall constructions providing the heating surfaces therefor, in assemblies incorporating such improved heating surface wall constructions, and to a novel method of evaporating liquid by disposing it in the form of film falling downwardly over generally vertically disposed heating surfaces.

In falling film type evaporators heretofore employed, the constructions have been quite expensive and complicated, particularly in the multiple effect types, not only due to the heating surface wall formations and mountings thereof, but primarily due to such things as the special provision of vapor bodies and more particularly to the complicated piping and pumping arrangements necessary for the operation of the evaporators. Besides being of expensive construction, such evaporators have been expensive to operate.

The evaporator construction of the invention changes all this by providing assemblies of heat exchange walls of a most simple and economical construction with vapor bodies likewise of simple, economical construction. Furthermore, the assembly of these walls and vapor bodies is achieved in simple, economical manner and results in a straightforward construction eliminating a substantial part of the large piping and valves, as well as other equipment heretofore required for prior art evaporators.

According to the invention there is provided a falling film type evaporator having a heat exchange wall member, which member comprises a plurality of opposed sheet sections of light gauge heat transmissive material positioned in spaced substantially side by side relationship to form an elongated row, means for joining one of the end edges of each of said sections to the opposed edge of the next adjacent section to form a pleated structure providing a plurality of interspaces between said sections, said interspaces alternately opening to one vertical side and then the other of said structure, vapor bodies positioned along the opposite sides of said structure throughout said row, said vapor bodies comprising vapor chambers each formed with an opening in the wall thereof, the vapor body on one side of said row communicating with one set of said interspaces and the vapor body on the other side of the row communicating with the alternately opening set of said interspaces.

Liquor to be evaporated is introduced into a first set of said interspaces adjacent the upper ends thereof so as to be formed into films which substantially cover the heating surfaces, which bound said first set of interspaces, of the plate or plates forming the evaporator. Said films fall generally vertically downwardly along said heating surfaces. The vapor from the said falling films of liquor flows freely generally laterally out into a first vapor body, with which the said first set of interspaces communicate. The concentrated liquor falls from the lower ends of the heating surfaces in said first set of interspaces, and is collected at the bottom of said first vapor body to be forwarded for further evaporation in subsequent effects.

Heating fluid, such as live steam in the first effect of a multiple effect evaporator, or, in subsequent effects, the liquor vapors produced in previous effects, is fed to the other, second vapor body and thence flows freely generally laterally into the other, second set of interspaces, which communicate with such second vapor body. Condensate from the said second set of interspaces is collected at the bottom thereof, and is discharged therefrom. Such condensate, whether that which results from the heating steam for the first effect, or that from the heating side of subsequent effects, is preferably discharged to flow through a feed preheater.

Accordingly, an object of the invention is to provide an improved, novel method of evaporating liquids in falling film evaporators.

A further object of the invention is the provision of such method wherein the vapors emanating from the heated liquid are discharged in cross-stream in relation to the falling liquid film with no further contact with the liquid except that with the falling liquid film.

Yet another object of the invention is to provide simplified assemblies of simple, economical, wall members with comparable simple economical vapor bodies.

Another object is to provide such assemblies utilizing a minimum of materials and keeping the work of effecting the assemblies down to a minimum.

Still another object is to reduce the piping requirements of falling film type evaporators to a minimum.

A further object is to effect that reduction in part by the complete elimination of piping for the transfer of vapor from one effect to the next in multiple effect evaporators.

A still further object is to provide heating surfaces for evaporators equally suitable to multiple effect and recompression evaporators, thus substantially reducing the cost of both of such types of evaporators.

Further and more detailed objects of the invention will in part be obvious and in part be pointed out as the description of the invention taken in conjunction with the accompanying drawing proceeds.

In that drawing:

FIG. 1 is a top plan view of a pleated wall construction of the invention mounted within a cylinder to provide vapor bodies at either side of the wall construction.

FIG. 2 is a section taken on line 2—2 of FIG. 1 and looking in the direction of the arrows.

FIG. 3 is a view similar to FIG. 2 but showing an assembly with modified vapor bodies.

FIG. 4 is a similar view showing further modification of vapor bodies.

FIG. 4a is a further modification showing the vapor bodies positioned vertically.

FIG. 4b is a section on line 4b—4b of FIG. 4a.

FIG. 5 is a fragmentary view of a wall construction in accordance with the invention with the addition of spacer pins between the evaporator walls.

FIG. 6 is a part elevation, part sectional view on line 6—6 of FIG. 5 looking in the direction of the arrows.

FIG. 7 is a fragmentary plan view of evaporator walls in accordance with the invention showing liquor distribution means between such walls.

FIG. 8 is a section on line 8—8 of FIG. 7 looking in the direction of the arrows.

FIG. 9 is a view of a heat exchange wall in accordance with the invention showing perforations in the joining sections of the evaporator walls for the exhaust of non-condensable gases.

FIG. 10 is a fragmentary plan view of FIG. 9 again showing the perforations.

FIG. 11 is a diagrammatic sectional view as seen from above of a multiple effect evaporator assembly incorporating the heating surface wall construction of the invention.

FIG. 12 is a diagrammatic showing of a slight modification thereof.

FIG. 13 is a view similar to FIG. 11 illustrating the inclusion of an evaporator wall providing transfer wall surfaces in accordance with the invention in a recompression evaporator. This is in effect a plan section on line 13—13 of FIG. 15.

FIG. 14 is a face view of FIGS. 13 and 15 with the housing shown in section; and FIG. 15 is a section taken on line 15—15 of FIG. 13 and looking in the direction of the arrows.

The heating element, or heat exchange wall, of the evaporator is of the flat plate type consisting of a number of parallel plates positioned a short distance apart and mounted in vertical position. This heating element, which might also be described as a pleated sheet bundle, may be formed by welding together the alternate end edges of pairs of plates throughout their full vertical height to form two separate oppositely opening channel systems as shown in dotted lines in FIG. 1. Instead of welding a number of plates, the heating element can be formed by the bending of a long single sheet into the desired configuration. For simplicity of illustration, the latter form is shown in the accompanying drawing and by reference to FIGS. 7, 11, and 13, it will be seen that the pairs of opposed plates are designated by the reference characters 2 and 4 with their vertical end joint portions being indicated at 3 and 6, and with such construction providing oppositely side opening interspaces 5 and 9.

The assembly of the pleated sheet bundle with vapor bodies is variously illustrated in FIGS. 1–4b. In FIGS. 1 and 2 the sheet bundle, shown in dotted lines in FIG. 1, is shown as positioned within a cylindrical housing, generally indicated at 26. This housing, considered as extending horizontally, extends throughout the length of the sheet bundle, which, as generally illustrated in FIG. 1, appears as a single effect made up of a large number of alternately oppositely opening interspaces. The sheet bundle, whose greatest extent is in the vertical direction, is centrally mounted within the cylinder 26 and is spaced from the walls of that cylinder. Vertical partitions 27 and 28 extend upwardly from the top of the sheet bundle to the wall of the cylinder and downwardly in the case of the partition 28. These are positioned along the vertical center line of the sheet bundle; it will be appreciated that they meet the top and bottom of the sheet bundle in the zone in which filler pieces (not specifically shown) overlap. Thus the partitions 27 and 28 complete the isolation of the alternate sets of oppositely opening interspaces from each other. It is also important to note that the partitions 27 and 28, along with the sheet bundle, also separate the cylindrical housing 26 into two chambers 29 and 30 whose interiors are in communication with the interspaces open in their direction. The chambers 29 and 30 accordingly individually serve on one side as a vapor conduit for conducting the vapor to be used in heating into the particular alternate interspaces, and on the other side into a vapor body for enabling the vaporization and collection of the vapor resulting from the evaporation of the liquid in the interspaces. When channel switching is employed, the functioning of these chambers will, of course, be reversed.

The showing in these particular FIGS. 1 and 2 has been simplified in order to emphasize the manner in which the invention achieves simplification in the art of falling film evaporators over anything heretofore contemplated.

A modified combination of sheet bundle and housing for providing vapor bodies is illustrated in FIG. 3. Here the sheet bundle, generally indicated at 1, merely serves as the separating and at the same time joining element, between two hemi-cylindrical housings 31 and 32 to provide vapor bodies 33 and 34 at either side of the sheet bundle. Accordingly, then, the top 35 and bottom 36 of the whole sheet bundle must be closed, either by means of individual filler pieces, as above indicated, or by means of a complete plate extending all the way along.

A somewhat further modification of the basic assembly is illustrated in FIG. 4. Here again, the sheet bundle 1 serves as the joining and separating element for chambers 37 and 38 which form more than a hemi-cylinder and provide enlarged vapor bodies 39 and 40 for the sheet bundle. Again, the full length of the top 41 and bottom 42 of the sheet bundle must be completely closed.

In FIGS. 4a and 4b the vapor bodies 39a and 40a extend vertically. The sheet bundle 1a may thus have greater vertical height with the results desired from the evaporator determining the relationships of the elements.

The pressure difference across the heating elements provided by the sheet bundle of the invention is low, enabling light gauge stainless steel to be used for the heating surfaces. There is a tendency for the interspaces under the lower pressure to be partially closed by flexing of the walls thereof toward each other from greater pressure in alternate interspaces. This can be readily controlled by known means, as shown in FIGS. 5 and 6, where vertical walls 2, 4, and 8 are shown as equipped with spacer pins 43. These pins positioned in spaced relationship according to a uniform pattern extend across the interspaces from one wall thereof to the other and are secured to one face of the sheets 2. The next set is secured to the comparable face of the sheet 4 and so on. When the walls flex toward each other these pins engage the opposite sheets and maintain the desired spaced relationship.

In place of pins 43 spacer plates, as disclosed in the United States patent application of Curt F. Rosenblad, Ser. No. 267,248, entitled, Flexible Plate Heat Exchanger With Spacer Plates, filed March 22, 1963, now abandoned, could be employed.

Distributor means for distributing liquid through the partially vaporized and partially concentrated liquor is illustrated in FIGS. 7 and 8 incorporated in and with a sheet bundle, as in FIGS. 1–4. The wall sheets and interspaces are given the same reference characters as previously employed. A horizontal pipe 45 extends throughout the length of the sheet bundle. From it flat distributor tubes 46 extend into the alternate spaces in which the liquid is to be vaporized. The tubes 46 have suitable distributing devices 47 at their inner ends positioned on the center line of the interspaces and formed to distribute liquid on the opposed wall surfaces of alternate interspaces to flow down in a thin liquid film. This liquid as distributed is close to its boiling point at the prevailing pressure. The temperature can be either below or above saturation resulting in either preheating requirements or some initial flash. The liquid film flows down the heating surface vaporizing on its way, heat being supplied from condensing steam on the other side of the heating surface. Concentrated liquor flows off from the bottom. The distribution construction here shown is merely for illustrative purposes, it being understood that other suitable distribution means may be employed as desired.

As will be more particularly described in connection with the evaporators of FIGS. 11–15, inclusive, the vapors produced by evaporation of the falling films of liquid are discharged generally horizontally from the heated liquid in the films, and flow into that vapor body with which the heated liquid is in communication. Thus such vapors are discharged in cross-stream relation to the falling liquid film, with no further contact with the liquid but with the falling liquid films. As a result, there is only a small pressure drop in the vapors, thus produced, in their escape from the liquid film-containing interspaces into the respective vapor body. Such pressure drop is much smaller than that which occurs in the release and collection of vapors from liquid evaporated in prior falling film evaporators.

When employed in multiple effect evaporators, the heating for each effect subsequent to the first is accomplished by using the vapors from the preceding effect as the heating medium for the subsequent effect. These vapors necessarily contain a certain amount of non-condensable gases and unless provision is made for removing the non-condensable gases they will build up into what is, in effect, a gas pocket in the heating space preventing fresh steam or condensable vapor from entering that space, thus rendering the heating surface useless. Proper venting also contributes to uniform distribution of vapors on the condensing steam side providing for higher average overall heat transfer co-efficients. In prior art installations this is taken care of by merely providing means for exhausting the non-condensable gases. In the prior art also, some means, not always too effective, is commonly employed for regaining the heat content from these gases.

The instant invention provides highly effective means for taking off these non-condensables, plus a small amount of vapor to be cleared from one effect to the next to be taken off at the end for utilization in a preheater. This is accomplished, as shown in FIGS. 9 and 10, by merely forming small perforations 50 in the vertical wall bends, such as 3 and 6, where the wall material is pleated and turns back on itself. The size and positioning of these perforations may be determined for the particular installation and the manner in which perforations in these positions acts to overcome the prior art defect in this regard will be further explained as the complete assembly of the invention is described. Having considered then the novel elements of the invention, attention is now directed to the utilization of them in a multiple effect evaporator, as shown in FIG. 11. Here an evaporator wall construction, as shown at 1 in FIGS. 1 and 2, is shown in multiple effect form positioned within a cylindrical housing as shown at 26 in FIGS. 1 and 2. Here it is to be seen that there are a multiple of effects numbered 51–56, inclusive, it being understood, however, that the showing of this number of effects is only for illustrative and not limiting purposes, since normally a greater or lesser number might well be employed. Furthermore, though the wall construction 1 in each effect is shown as having only three condensing vapor interspaces 5 and three liquor vaporization interspaces 9, this number of interspaces is again for illustrative purposes and is a smaller number than would normally be employed. Furthermore, for facilitating the illustration the spacer pins 45, as seen in FIG. 5, have been omitted from this showing, though it is to be understood that they, or other types of spacer members heretofore referred to, would be employed throughout in all of the interspaces throughout the evaporator.

To a large extent the detail of each effect is the same, so an explanation of the consthruction and operation of effect 51 will largely suffice for effects 52–56. Commencing, then, with the introducing of the feed and appreciating that the FIG. 11 showing is a sectional view as seen from above the evaporator, it has a feed preheater 57 extending along one side thereof. The liquor feed supplied through the pipe 58 is pumped by the pump 59 through the pipe 60 into this preheater and, as indicated by the line 61, flows through the length of the preheater and out of the same at the far end 62. This preheater may be of any suitable type and could commonly be an indirect heat exchanger with the heating effect being provided by hot condensate from the evaporator taken off from the effects through pipes connected to the heater 63 through which the condensate flows out to the pipes 64 in a countercurrent relationship with respect to the feed 61 under the action of the pump 65.

The light line 66' drawn through the middle of the preheater 57 is merely to illustrate the use of the heat exchanger wall between the feed and condensate, etc., flow in the heat exchanger.

The feed flowing through the pipe 62 has its flow into the first effect controlled by the level control valve 66 connected by the control line 67 through the control device 68 to the product outlet conduit 69 for the first effect 51. Thus the feed is related to the level of the product and this is true from effect to effect so that the faster the product is taken off through the product outlet line 70 at the end of the evaporator, the more the various feed control valves from effect to effect will be opened to provide feed flow. The reverse would also, of course, be true.

The feed passing through the pipe 62 under control of the valve 66 thus flows into the header 45 for the effect, as shown in FIG. 7, and from that header, is distributed through the flat distributor pipes 46 to the distribution devices 47 at the ends on those pipes. Thus distribution devices, as illustrated by the arrows 71 in FIG. 11, serve to distribute the liquor to be evaporated on the opposite facing walls of the interspaces 9.

In the first effect, the liquor distributed on the facing walls of the interspace 9 and flowing down the same in the form of a film arrives substantially at the boiling point and is further heated by live steam introduced through the pipe 72 into the vapor body conduit 30 (see FIG. 1) at one side of the pleated vaporizer wall. Thus the live steam enters the interspaces 5, heats the walls 2 and 4, and, accordingly, vaporizes a portion of the liquor flowing down those walls. In doing so the major portion of this steam is condensed, flows out through the short condensate pipe 73, through which it flows into the condensate side of the feed preheater 57, joining the line 63 as indicated. Inasmuch, however, as even live steam contains a certain amount of non-condensable gas in the form of air, or other gas, but primarily in the interests of good live steam distribution, perforations 50 are provided even in the first effect to let some of the steam flow through along with the non-condensable gas.

The vapor from the falling films of liquor on the opposed faces of the walls 2 and 4 in the interspaces 9 freely flows out into the vapor body 29 and has with it a small portion of non-condensables and live steam vapor. The concentrated liquor which, in this instance, is the product, flows out from the bottom of the evaporator through the pipe 69 and, due to the pressure difference between effects 51 and 52, flows into the header 45 for the effect 52. Again, however, under control of the valve 76 which controls the flow of feed through the pipe 69 in response to the level of concentrated liquor in the outlet pipe 77 in the effect 52, the same as is done in effect 51.

The vapors from the liquor partially concentrated and partially evaporated in the effect 51 escape from the films on the heating surfaces and travel generally horizontally out through the open ends of the interspaces 9 into the vapor body 29. Such vapors then flow through the vapor body 29 and past the end 78 of the partition 79 which extends transversely of the housing 26, thus isolating the vapor body 30 in the first effect from the vapor body 29 thereof and also from the vapor body 29 of the effect 52 into which the heated vapors flow through the passage 80. It will thus be seen that the vapors produced in the effect 51 serve as the heating medium in the effect 52 where the opening direction of the interspaces is reversed so that now the interspaces 9 receive the heating vapor while the interspaces 5 are bordered by the heat exchange walls on which the flowing film of liquor is partially evaporated. In this instance it will be seen that the partition wall 79 forms one wall of the first interspace 5, as well as forming the wall of the last interspace 9 of the first effect. Here, however, the liquor in the first effect will be hotter than it is in the second effect, so that the partition wall 79 acts the same as one of the normal heat exchanger walls of the evaporator. It will be understood that the manner of escape of vapors from the liquor partially concentrated and partially evaporated in effect 52, as well as in the subsequent effects, and their direction of travel relative to the respective vapor body into which they flow, are the same as described above in effect 51.

Again, liquor, further condensed, flows out through the pipe 76' commencing at the bottom of the evaporator and again, through differential pressure, flows into the next effect 53 to the extent permitted by the control valve 81, again controlled by the level of the product flowing out through the outlet pipe 82. Similar controls are employed throughout the evaporator with valves interposed in the product pipes 83 and 84 until finally, the product in the form of liquor concentrated to the desired extent, flows out through the pipe 70.

At the same time, condensate resulting from the condensing of the heating vapors in each effect is taken off respectively through the pipes 85 in effect 52, 86 in effect 53, 87 in effect 54, 88 in effect 55, and 89 in effect 56 through which pipes the condensate flows under suitable valve control as may be desired into the condensate side of the feed preheater 57.

The heating vapors in the vapor body 29 of the effect 52 are isolated from the effect 53 by means of a partition 90, but the vapors resulting from evaporation of liquor in effect 52 flow freely out of the interspaces 5 into the vapor body 30 and around the end 91 of the partition 90. Thus these vapors serve as heating medium in the effect 53, and are condensed as a result thereof. Similarly, vapors are given off as feed liquor and are partially evaporated on down through the evaporator from effect to effect. The liquor becomes more concentrated in each effect and the vapors given off in each effect are employed as the heating medium in the next effect. The pressure differential from effect to effect in the evaporator of the invention is such that normally no pumping of the product from withdrawal from one effect to introduction into the next is needed.

Commencing with effect 52, the non-condensable gases resulting from the vaporization of the liquor in effect 51 will build up on the vapor side of each effect and act as a deterrent to heat transfer if they were trapped in the effect rather than being removed therefrom. However, the invention provides for this by the small holes 50 in the rounded end walls 3, so that the non-condensables and a small part of the vapor entrained therewith passes through these holes to join with the vapor being produced on the liquor side by the evaporation of the liquor. Such holes are provided in each effect, as is seen, so that the non-condensable and with a small part of the vapor flow through the holes all the way along the assembly until they arrive in the vapor body 30 of the last effect 56 all join together and flow out through the steam with them, and the liquor vapor produced in the last effect 56 all join together and qow out through the steam pipe 93. The combination of steam, or liquor vapor and non-condensables here, flows off to where its heat content is utilized in suitable manner.

From a consideration of the FIG. 11 showing in the light of the details previously disclosed in this application, it will be apparent how the provision of an economical pleated wall of thin heat exchange material, when suitably mounted in a housing providing vapor bodies at opposite sides thereof, and when provided with simple feeds and outlets enables the production of a multiple effect evaporator of fully effective, though much more simple construction than anything taught in the prior art.

It will be seen that in each of effects 51–56 the heating medium consists of vapor, and that the heating vapor is fed to the outer, heating surfaces of the plate members defining the liquid-receiving channels generally horizontally from the closed vertical edges of the liquid-receiving channels toward the vertical open edges of said channels. Thus in each of said effects heating vapor travels generally cross-stream relative to the path of the liquid films falling on the inner surfaces of the plate members defining said liquid-receiving channels. Such manner of travel of the heating vapor is of advantage in that such vapor has ready access through the open edges of the heating medium receiving interspaces throughout the height thereof. As a result, the heating vapor is subjected to only a small pressure drop in its passage into such interspaces.

The evaporator as seen in FIG. 11 is readily adaptable to modification of various sorts. One such modification is shown diagrammatically in FIG. 12, where the liquor feed 94 instead of being introduced at the left-hand end of the evaporator as in FIG. 11, is introduced into the next to the last effect 55 thereof. It is partially vaporized therein, passes to the effect 56, is further vaporized there and the resultant partially concentrated liquor is taken out through the line 95 and is pumped by means of the pump 96 around through the feed line 97 in the feed preheater 98 in which it is heated, and it is introduced at 99 into the effect 51 at the left-hand end of the evaporator. Then the same procedure as in FIG. 11 is followed, except that the resultant product is taken out from the effect 55 through the pipe 100 while the vapor given off in the effect 54 is utilized for heating in the effect 55 and the vapor given off in the effect 55 is utilized in the effect 56. The actual flow pattern in modifications such as this is a function of overall economics and available feed plus desired product temperature.

The application of the wall and housing construction of the invention to recompression evaporation is shown in FIGS. 13, 14, and 15 with FIG. 12 showing diagrammatically the scheme of operation. Again, the above described pleated wall formation of the invention is employed, as is a cylindrical housing providing vapor bodies, as shown in FIGS. 1 and 2. Accordingly, the pleated wall and vapor bodies are indicated by the same reference characters. Again, also, though the number of interspaces provided at either side of the vertical partition 105 is nine, this is merely for illustrative purposes and is a small number compared to what would normally be present in a recompression evaporator.

The evaporator here is divided by the partition 105 into two sections, generally indicated at 106 and 107, the difference being that in the section 106 liquor is concentrated to a certain extent of which 25% is a non-limiting example, while the liquor in section 107 is concentrated to a higher degree, with here 50% being the non-limiting example. In putting such an evaporator into operation, however, the first compartment 106 can be run until the solid concentration of the desired amount, such 25% is obtained. Then that concentration is used as the feed for the second compartment 107. However, both compartments can be initially run until the concentration of 25% is reached, without taking out any product. Then all of the liquor of the 25% concentration can be introduced into the second compartment.

To consider briefly how this is done, it will be seen that besides the pleated wall construction already fully described and the vapor bodies at either side thereof, the evaporator has an initial feed through a pipe 108 (FIG. 14). The flow through this pipe is controlled by a control valve 109 operated by a liquid level control device which responds to the liquid level control in the liquor concentrated and collecting in the bottom of the housing for recirculation. This liquid level control is in the outlet pipe.

From the header 43 the liquor being recirculated flows out the distributor pipes 46 and is distributed from the distribution heads 47 to form flowing films on the opposed faces of the liquor interspaces of the evaporator as previously described. In this instance, however, the concentrated liquor at the bottom of the evaporation surfaces collects on a bottom plate 113 and flows out on to a ledge, or shelf, 114 (see FIG. 15). This shelf 114 has an upstanding side 114a along its outer edge which extends up a short distance to terminate in an overflow lip 114b. Thus liquor concentrated by evaporation in the effects 5 collects on the shelf 114 and the portion of the liquor which overflows the lip 114b, flows down and is collected in the pipe 110 where it is joined by fresh feed from the pipe 108 to the extent necessary, as called for by the liquid level control. At the same time, liquor from the bottom of the shelf 114 will flow off through the pipe 115 to serve as the feed for the second compartment 107. Here, again, however, the flow through the pipe 115 is controlled by the liquid level control valve 116 which responds to the liquid level in the run-off pipe 117 collecting the overflow from the shelf 114c in the second compartment. A valve 116 interposed in pipe 115 is under the control of a liquid level control device which is associated with pipe 117 in the same manner as the liquid level control device in pipe 110 which controls the above mentioned valve 109. Liquor flowing down through the pipe 117 is pumped by the pump 118 back up the pipe 119 and is distributed in the liquor interspaces in the compartment 107 by another header 45 connected through distribution pipe 46 with distributor heads 47. Again, when the liquor on the shelf 114c has been concentrated to the desired extent, the valve 120 in the product take-off pipe 121 is opened and the product is taken off.

As distinguished from the multiple effect evaporator, it will be seen that the recompression evaporator has a vapor body 29 which is continuous through both compartments 106 and 107. However, by reference to FIG. 15 it will be seen that aligned vertical partitions 122 and 123 extend along the length of the evaporator at the midpoint thereof, so that vapor discharged into the vapor body 29 for heating and evaporating liquid on the opposite sides of the interspaces 5 serves for heating in both compartments 106 and 107 but cannot flow over to the other side. In the course of the heating it is condensed and collects in the bottom of the housing to the right of the partition 123, as seen in FIG. 15, and flows out through the outlet 124. Though the partitions 122 and 123 are here shown at the midpoint, thus separating the housing into substantially equal compartments, it will be understood that, practically, the compartments operating at lower boiling points would be the larger.

The vapor for effecting the heating in the recompression evaporator is the vapor given off by the vaporization of the liquid in the interspaces 5. The tops of those interspaces are closed, as seen at 125 in FIG. 15, so the vapor flows out of the open mouths 10 of the interspaces 5 up through a chamber 126, then through an entrainment separator 127 which takes out any liquid, leaving nothing but vapor in the upper small compartment 128. This vapor is then sucked down through the suction pipe 129 where it is compressed and heated in compression by means of the compressor 130, thereafter being discharged up through the pipe 131 as the heating medium for both compartments of the evaporator.

For removal of the non-condensable gases, each interspace is provided near its rounded end wall 3 with a vertical plate 135 which extends from side to side of the interspace and from top to bottom thereof. These plates are spaced from the ends 3 to a sufficient distance to provide channels 136 for the passage of gas up therethrough and the plates have spaced perforations 137 through them and extending through a larger part of the height thereof so that condensables in the interspaces may flow through the perforations 137 along with a certain small amount of vapor. These flows enter the chambers 136 and go up to the tops of the interspaces where they are joined to a vent header 138. This vent header extends across the top of the evaporator and is connected with all of the chambers 136. At its outer end it is provided with a throttle valve 139 to control the flow of vapor and non-condensables therethrough.

Though the wall construction of the evaporator providing opposed heat exchange walls with inner spaces may be made with principal portions of such opposed walls extending in parallel relationship, it is also to be noted in certain instances such opposed walls can be angularly related to each other instead of being parallel. Then, again, though it might appear from the showing in FIGS. 4a and 4b that the number of effects might be limited by employing vertically extending cylindrical vapor bodies, that is not necessarily so, since the vapor bodies can be made of such a size that they would still encompass a multiple of effects.

Those skilled in the art, on considering the disclosure of this invention, may well devise changes in the same and develop different embodiments on the basis of the teaching of the invention and without departing from the spirit and scope thereof. It is, accordingly, intended that all matter contained in the above description or shown in the accompanying drawing shall be interpreted as illustrative and not in a limiting sense.

Having described my invention, what I claim as new and wish to secure by Letters Patent is:

1. A falling film type evaporator, comprising a heat exchange wall member, said wall member comprising a plurality of substantially similar opposed sheet sections of light gauge heat transmissive material positioned in spaced substantially vertical side by side relationship to form an elongated row, means for joining one of the substantially vertical end edges of each of said sections to the opposed edge of the next adjacent section to form a pleated structure providing a plurality of substantially similar interspaces between said sections, said interspaces alternately opening to one vertical side and then the other of said structure, vapor bodies positioned along the opposite sides of said structure throughout said row, said vapor bodies comprising vapor chambers each formed with an opening in the wall thereof, the first vapor body, on one side of said row, communicating through the opening in the wall thereof with one set of said interspaces, and the second vapor body, on the other side of the row, communicating through the opening in the wall thereof with the alternately opening set of said interspaces, means in first, alternate ones of said interspaces along said pleated structure communicating with the first vapor body for distributing liquor to be vaporized in the form of a falling film on the heating surfaces provided by the sheet sections of said pleated structure, said distributing means distributing said liquor adjacent the top of said heating surfaces, and means to prevent the entrapment of non-condensable gases in said first and second interspaces comprising small passages through the sheet sections adjacent the closed vertical edges of the interspaces.

2. A method of evaporating liquid in a falling film evaporator, said evaporator having an array of a plurality of substantially vertically disposed substantially parallel heat transmissive plates having their main portions of substantially rectangular form, said plates having their centers substantially aligned on an axis perpendicular to their planes, successive plates being sealed to each other at vertical joints which alternate between the opposite vertical edges of the plates, successive plates being further sealed to each other at joints which alternate between the upper and lower edges of the plates, said thus connected and sealed plates defining a plurality of horizontally deep channels forming two channel systems, the channels of which alternate with each other, one of said channel's systems being adapted to receive liquor to be evaporated and the other being adapted to receive heating medium, the channels of the channel system for liquor being open along their vertical edges at the same side of the plate array, said method comprising wetting with falling films of said liquor to be evaporated the inner confronting surfaces of the liquor channels, supplying the other, heating channels with a heating medium, providing a vapor body in direct communication with the liquor channels through and at least substantially throughout the lengths of the open vertical edges thereof, and subjecting the vapor body to a reduced pressure, whereby the vapors given off by the films of liquor as they fall downwardly along the surfaces of the plates defining the liquor channels are discharged generally horizontally from the open edges of the liquor channels in cross-stream relation to the falling liquid films with no appreciable further contact with the liquid except with the falling liquid films.

3. A falling film evaporator, said evaporator comprising an array of a plurality of substantially vertically disposed substantially parallel heat transmissive plates having their main portions of substantially rectangular form, said plates having their centers substantially aligned on an axis perpendicular to their planes, means for sealing successive plates to each other at vertical joints which alternate between the opposite vertical edges of the plates, means for further sealing successive plates to each other at joints which alternate between the upper and lower edges of the plates, said thus connected and sealed plates defining a plurality of horizontally deep channels forming two channel systems, the channels of which alternate with each other, one of said channel systems being adapted to receive liquor to be evaporated and the other being adapted to receive heating medium, the channels of the channel system for liquor being open along their vertical edges at the same side of the plate array, means for wetting the inner confronting surfaces of the liquor channels with falling films of said liquor to be evaporated, means for supplying the other, heating channels with a heating medium, a vapor body in direct communication with the liquor channels through and at least substantially throughout the lengths of the open vertical edges thereof, and means for withdrawing the vapors from the vapor body under a reduced pressure, whereby the vapors given off by the films of liquor as they fall downwardly along the surfaces of the plates defining the liquor channels are discharged generally horizontally from the open edges of the liquor channels in cross-stream relation to the falling liquid films with no appreciable further contact with the liquid except with the falling liquid films.

4. A multiple effect falling film evaporator, each effect of said evaporator comprising an array of a plurality of substantially vertically disposed substantially parallel heat transmissive plates having their main portions of substantially rectangular form, said plates having their centers aligned on an axis perpendicular to their planes, means for sealing successive plates to each other at vertical joints which alternate between the opposite vertical edges of the plates, means for further sealing successive plates to each other at joints which alternate between the upper and lower edges of the plates, said thus connected and sealed plates defining a plurality of horizontally deep channels forming two channel systems, the channels of which alternate with each other, one of said channel systems being adapted to receive liquor to be evaporated and the other being adapted to receive heating medium, the channels of the channel system for liquor being open along their vertical edges at the same side of the array, means for wetting the inner confronting surfaces of the liquor channels with falling films of said liquor to be evaporated, means for supplying the other, heating channels with a heating medium, a vapor body in direct communication with the liquor channels through and at least substantially throughout the lengths of the open vertical edges thereof, and means for withdrawing vapors from the vapor body under a reduced pressure, whereby the vapors given off by the films of liquor as they fall downwardly along the surfaces of the plates defining the liquor channels are discharged generally horizontally from the open edges of the liquor channels in cross-stream relation to the falling liquid films with no appreciable further contact with the liquid except with the falling liquid films, the effects being disposed in substantial horizontal alignment, said vapor withdrawing means feeding vapors released from the open vertical edges of the liquor channels of a prior effect into the vapor body of such prior effect directly to the heating channels of the next subsequent effect in a substantially horizontal flow path.

5. A falling film type evaporator, comprising a heat exchange wall member, said wall member comprising a plurality of substantially aligned opposed sheet sections of light gauge heat transmissive material positioned in spaced substantially vertical side by side relationship to form an elongated row, means for joining successive sections to each other at vertical joints which alternate between the opposite vertical edges of the sections, means for joining successive sections at joints which alternate between the upper and lower edges of the sections, thereby to form a pleated structure providing a plurality of interspaces between said sections, said interspaces alternately opening to one vertical side and then the other of said structure, vapor bodies positioned along the opposite sides of said structure throughout said row, said vapor bodies comprising vapor chambers each formed with an opening in the wall thereof, the first vapor body, on one side of said row, communicating through the opening in the wall thereof with one set of said interspaces, and the second vapor body, on the other side of the row, communicating through the opening in the wall thereof with the alternately opening set of said interspaces, means in first, alternate ones of said interspaces along said pleated structure communicating with the first vapor body for distributing liquor to be vaporized in the form of a falling film on the heating surfaces provided by the sheet sections of said pleated structure, said distributing means distributing said liquor adjacent the top of said heating surfaces, conduit means connected to the first vapor body to remove vapors given off by the films of liquid on the heating surfaces of the sheet sections, whereby said vapors are discharged from the open edges of the first interspaces in cross-stream relation to the falling film with no appreciable further contact with the liquid except with the falling liquid film, conduit means connected to the second vapor body to introduce a fluid heating medium thereinto and thence to the second interspaces, and means to prevent the entrapment of non-condensable gases in said first and second interspaces comprising small passages through the sheet sections adjacent the closed vertical edges of the interspaces.

References Cited by the Examiner

UNITED STATES PATENTS

| | | | |
|---|---|---|---|
| 1,031,199 | 7/1912 | Rigney | 159—28 X |
| 2,455,059 | 11/1948 | Hickman | 203—89 X |
| 2,703,310 | 3/1955 | Kretchmar | 202—236 X |
| 2,803,589 | 8/1957 | Thomas | 202—236 |
| 3,190,817 | 6/1965 | Neugebauer et al. | 159—13 X |
| 3,211,633 | 10/1965 | Hammer et al. | 202—236 |

NORMAN YUDKOFF, *Primary Examiner.*

J. SOFER, *Assistant Examiner.*